PROCESS FOR THE CODING OF MESSAGES

Filed Aug. 8, 1962 3 Sheets-Sheet 1

INVENTOR.
Kurt Ehrat
BY
Pierce, Scheffler & Parker
Attorneys

PROCESS FOR THE CODING OF MESSAGES

Filed Aug. 8, 1962 3 Sheets-Sheet 2

INVENTOR.
Kurt Ehrat
BY
Pierce, Scheffler & Parker
Attorneys

INVENTOR.
Kurt Ehrat
BY
Pierce, Scheffler & Parker
attorneys

United States Patent Office 3,291,908

Patented Dec. 13, 1966

3,291,908

PROCESS FOR THE CODING OF MESSAGES

Kurt Ehrat, Zurich, Switzerland, assignor to Gretag Aktiengesellschaft, Zurich, Switzerland Filed Aug. 8, 1962, Ser. No. 215,674
Claims priority, application Switzerland, Aug. 18, 1961, 9,647
14 Claims. (Cl. 178—22)

Figures 1, 2, 3, 4, 5:
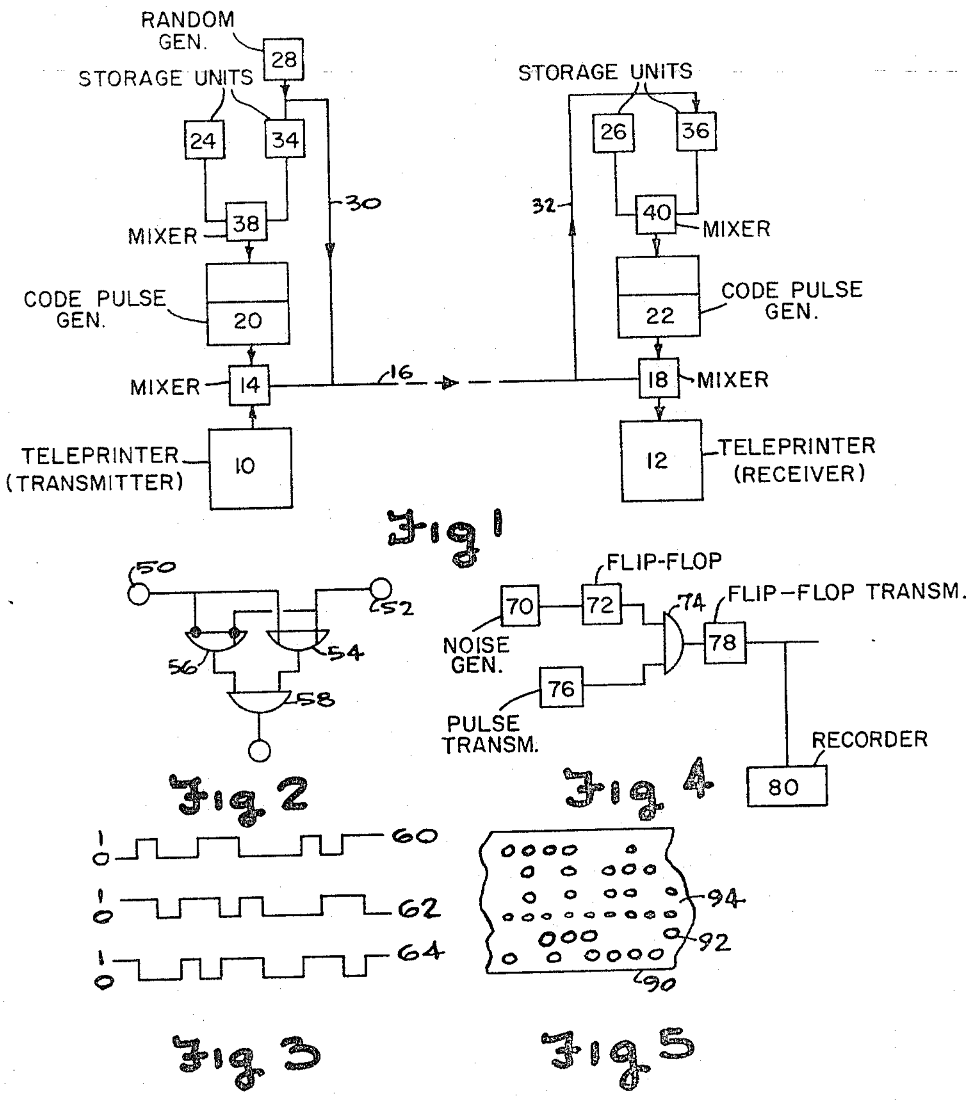

This invention relates to a method of coding messages, e.g., in telegraphy or in pulse-modulated telephony.

In order to code messages, which nowadays is usually effected in the form of impulses, the individual elements of the message, for instance letters or numerals, or in the case of messages transmitted in the form of impulses, the corresponding impulses and combinations of impulses, are first mixed at a transmitter with as irregular as possible a sequence of corresponding elements—the so-called code elements—and are transmitted in this mixed form. At the receiving end, reproduction of the original message is performed by means of a second identical sequence of code elements. These code element squences—i.e., code pulse sequences or code pulse combination sequences in the case of transmission in the form of pulses or combinations of pulses—must be present in identical form at the transmitter and at the receiver. In order to ensure adequate security against unauthorized decoding, the code element sequences must possess a sufficiently large cycle before repetition occurs; also, the different types of code elements should have the nearest possible approximation to a statistical (random) distribution.

Such coding methods have been previously proposed and two groups of methods for generating the code pulse sequences may be distinguished.

In the first group, so-called punched tape machines, in which a sequence of code pulses is taken from a so-called random punched tape, are used as code pulse generators. The random punched tapes are punched tapes of the type known in telegraphy, the holes or combinations of holes of which are distributed purely at random (statistically) and form the code pulse sequence, so-called random generators generally being used in order to generate such an irregular sequence.

For the coding of messages, it is necessary for identical random punched tapes to be present at the transmitting and receiving ends; tapes being brought into the same initial position at the transmitter and at the receiver at the commencement of a message transmission, and running synchronously starting from that position. In order to preserve secrecy, a random punched tape can be used only once. One combination of holes in the random tape is therefore used up for each elemnt—e.g., letters—in the message.

An advantage of this first type of coding method lies in the fact that, owing to the purely random distribution of the code sequence, unauthorised deciphering of the message is impossible without possession of the random punched tape. However, a disadvantage of the method is the high consumption of random punched tapes, which must moreover be manufactured, transported and stored in such a way that loss or theft is impossible. Furthermore, this method is not suitable for so-called exchange traffic, where one station can enter into connection with any desired other station of a large network.

In the second group of coding methods, mechanical or electrical appliances or circuits are used as code pulse generators. The programme of code pulses generated by the latter is dictated by the constantly modified position of a large number of code forming elements—such as, e.g., cam discs, permutating switches or electronic circuits—and their possibly variable mutual association, or cabling. Accordingly, this code pulse programme is dependent upon the structure and interplay of the individual elements, and furthermore upon the position of all the said elements at the commencement of message transmission. This so-called initial state must be adjusted at the transmitter and receiver before commencement of the transmission, whereupon, given synchronous starting and running, the code generators of the receiver and transmitter deliver the required identical sequence of code elements.

Since it is necessary to assume the structure of the code pulse generator as known, the secrecy of the coding therefore lies only in the initial state of the code pulse generator. This is therefore regarded as the so-called secret basic code, which has to be conveyed to the connected stations—e.g., by courier. For reasons of secrecy, there must be the possibility of commencing the coding repeatedly from new initial positions of the ciphering devices and of the code pulse generator. This is also necessary, for example, in exchange traffic when connection with a fresh station has to be established, or in the case of incorrect switching or incorrect operation of the code pulse generator. Also for reasons of secrecy, there is a demand that a specific initialp osition—i.e., a specific basis code—must be used only once. It is therefore customary to collate a number of different basic codes in tables and to distribute them to the various stations of a network. This has great disadvantages in the case of exchange traffic, since each basic code can be used only once, and there is a possibility that two stations which are required to collaborate afresh may no longer have the same unused basic codes. Other disadvantages of these basic code tables are large evolume of secret documents and their complicated management.

It is an object of the present invention to avoid these disadvantages.

According to the invention, there is provided a method of coding messages transmitted in the form of pulses, wherein clear message pulses are mixed with code pulses at a transmitting station and are reproduced by the use of identical code pulses at a receiving station, the transmitting station and receiving station including code generators of identical construction for producing identical reproducible code pulse sequences which are determined by the initial state of the code generators, and wherein the number of possible initial states is large in comparison with $10^{10}$ and the said initial state is determined from a first state information present in stored form at the transmitting and receiving stations and from a second state information determined at random at one of the stations and transmitted to the other station.

The first state information, which is present in stored form at the transmitter and receiver, is hereinafter designated the basic code.

The second state information, determined at random, which after being obtained at one of the stations cooperating to transmit the message, is transmitted to the other station, is hereinafter designated the code shift information.

In an especially advantageous application of the method, the second state information is obtained at the transmitter—for example, using a random generator—and is passed uncoded to the other stations.

The initial state and the state informations may for example be represented as a sequence of letters or numerals. In this case, the said sequences of letters or numerals advantageously possess equal numbers of places. The individual elements of the initial state and of the random information—i.e., the individual letters or numerals for example—are distributed in as irregular a sequence as possible. It is especially favourable, in order to simplify the construction of the apparatus, if the initial state and the state information have the form of binary numbers —i.e., numbers which are constructed solely from the two elements "0" and "1."

According to the present invention, the numbers of possible initial states of the code generator are large in comparison with $10^{10}$. By this means, the possible number of initial states is so large that they are not accessible to searching processes, even using the most rapid electronic means and circuits. For example, if the initial state and the state informations are indicated in binary form and consist each of 165 individual elements (bits), then $2^{165}$, which is approximately $10^{50}$, different initial states are possible. At least the first state information of the basic codes is present in stored form, and such storage may take place for example by registration in the form of a punched tape, or by magnetic or photographic storage. For example, if a basic code of the said length is stored in the form of a standard 5-element punched tape as used in teleprinters, then with 165 elements, 33 transverse rows of holes having a width of 2.4 mm. each are produced. The registration therefore requires only a piece of punched tape 8 cm. long. If the random informations are obtained by using the random generator, then the totality of the $10^{50}$ possible combinations are possible. When this first random information of the basic code has been mixed with a second random information of the code shift information, determined from case to case, then equal probability of all the possible initial states is present.

The representation of the initial state and of the state information is further facilitated by the use of the method where messages are transmitted in the form of pulses, in which cases only two pulse states are usually possible —for example, the states "0" and "1" or states "+" and "—."

To obtain the initial state, the first and second state informations are mixed together. For example, if both the informations consist of an irregular sequence of numerals, then the mixture may be effected for example by adding the individual elements by pairs without carry-over—for example, as follows:

| | |
|---|---|
| 1st state information: | 1 7 5 4 3 9 2 . . . |
| 2nd state information: | 3 5 6 1 2 4 3 . . . |
| Mixture: | 4 2 1 5 5 3 5 . . . |

If the state informations are present in the form of binary numbers, then the mixture may be performed by applying the known method of so-called "module-2 addition":

$$0+0=0$$
$$0+1=1$$
$$1+0=1$$
$$1+1=0$$

It is now the function of the code generator to produce a code pulse sequence which depends simply and solely upon its initial state. If identical code generators are brought into the same initial state, then they always generate the same—i.e., reproducible—code sequences. As also mentioned initially, it is necessary for these code sequences, firstly to possess as long as possible a cycle before they are repeated, and secondly the variation between successive elements or groups of elements should be as irregular (random) as possible. Furthermore, the structure of the code generator should so far as possible be so constituted that no simple deduction of the initial state is possible from the code pulse programme produced at the output of the code generator.

A code pulse generator therefore preferably contains at least one counter-like circuit and at least one feedback circuit. The counter-like circuit serves to determine a minimum length of the code cycle, within which no repetition of the code pulse sequence occurs, and therefore ensures the requisite minimum cycle length. The feedback circuit in turn ensures the requisite irregularity of the code pulse programme, which is thereby as nearly as possible of random distribution. The feedback circuit, as a constituent of the code pulse generator, is controlled by the instantaneous states of various points of the code pulse generator and in turn influences the running of the code pulse generator. The outputs of the counter-like circuit and of the feedback circuit co-operate in the formation of the code pulse sequence. Again, the initial position is determined in dependence upon the first and second state informations, either in that the initial position both of the counter-like circuit and of the feedback circuit is influenced simultaneously (parallel connection) or in that only the initial position either of the feedback circuit or of the counter-like circuit is determined by the state information, and that this then in turn determines the initial position of the other circuit (series connection).

Figure 6:
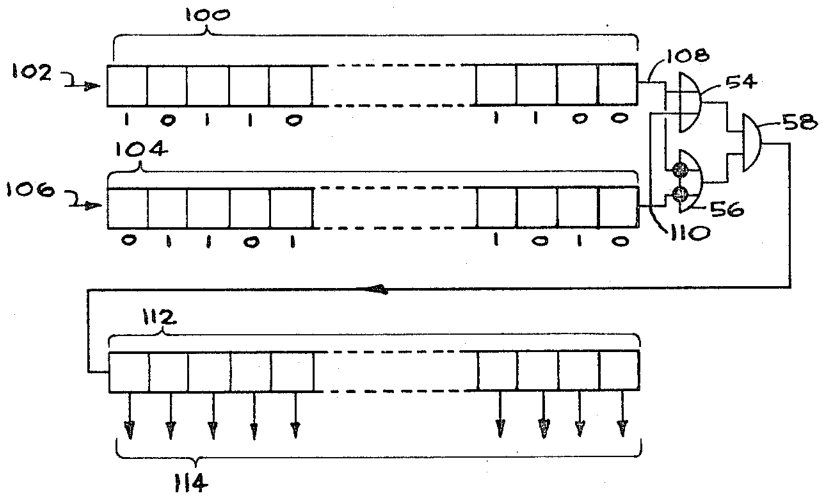
Figure 7:
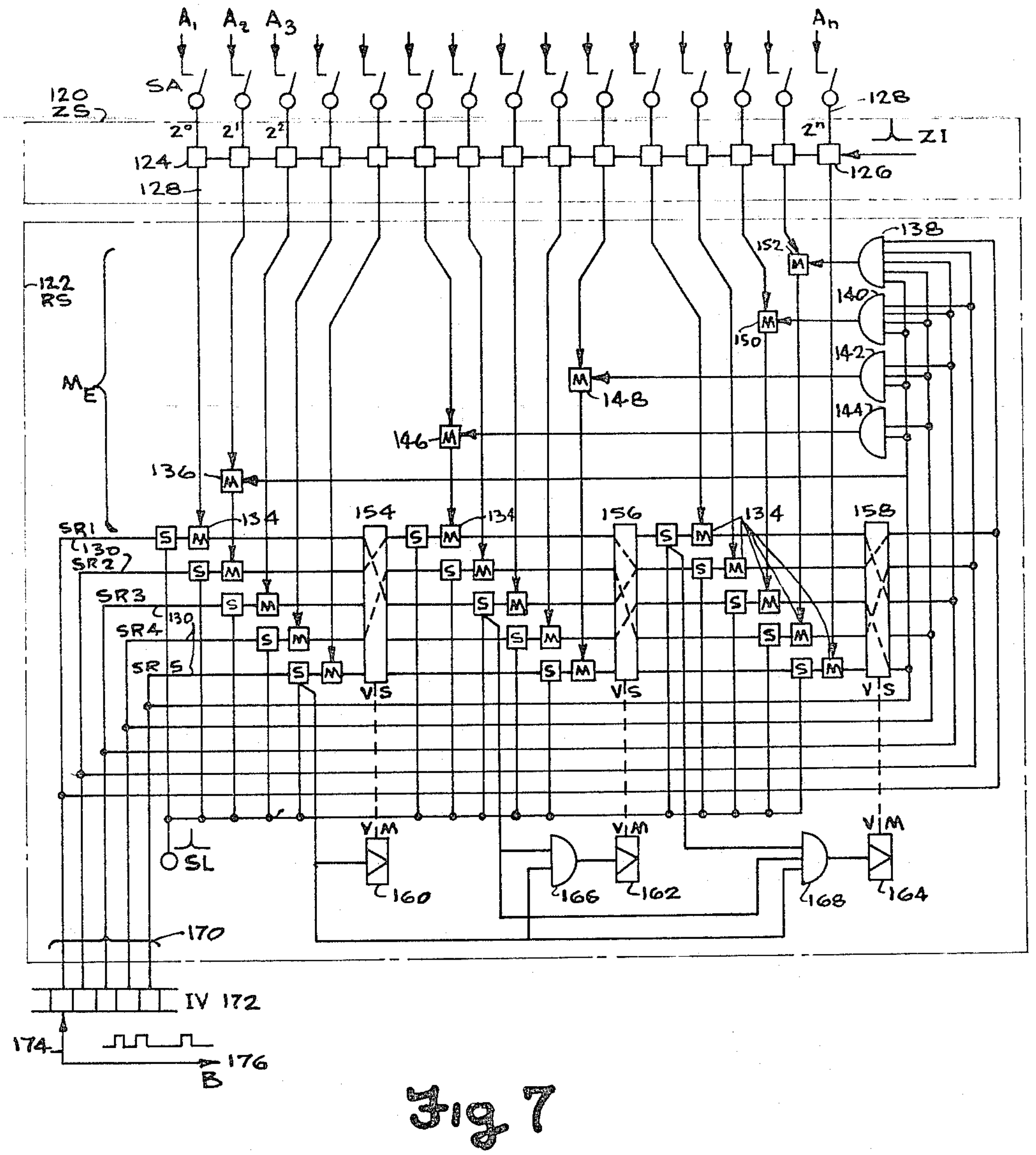

In order to enable the invention to be more readily understood, reference will now be made to the accompanying drawings, which illustrate diagrammatically and by way of example some embodiments thereof, and in which:

FIGURE 1 shows diagrammatically by means of a block circuit diagram, the structure of two stations co-operating as transmitter and receiver, FIGURE 2 shows a circuit using logical symbols for mixing pulse sequences, FIGURE 3 shows an extension of the principle of operation of FIGURE 2, FIGURE 4 shows the circuit diagram of a random generator for producing statistically distributed pulse sequences, FIGURE 5 shows a section of a punched tape for storing pulse sequences, FIGURE 6 shows a block circuit diagram of an apparatus for obtaining an initial state by mixing first and second state informations, and FIGURE 7 shows the circuit diagram of a code pulse generator.

Referring now to FIGURE 1, there is shown schematically as a circuit diagram, two stations cooperating as transmitter and receiver for the transmission of coded messages. At each of the two stations there is a message transmitting and receiving appliance 10 and 12, which transmit or receive the messages uncoded in the form of pulses. The said message transmitting and receiving appliances may be, for example, teleprinters of conventional type. The output of the teleprinter 10, which for example is used as a transmitter, feeds a mixer 14, whose output is connected to a transmission line symbolically represented by the arrow 16; which may be, for example, a cable connection, a wire connection or a wireless connection. At the receiving end, the transmission path enters a mixer 18 the output of which feeds the receiving teleprinter 12. For purposes of coding, code pulse generators 20 and 22 deliver to the mixers 14 and 18 sequences of code pulses which are mixed in the mixer 14 at the transmitting end with the message pulse sequences generated by the teleprinter 10. After the pulse sequences thus encoded have been transmitted via the line 16, the clear message pulses are produced once more by mixing with the identical code pulses produced by the code generator 22, and now control the receiving teleprinter 12.

In order to achieve the production of identical code pulse sequences at the transmitter and receiver, the initial states of the two code generators 20 and 22 must coincide. The determination of the initial state at the transmitter and receiver is effected by using a first state information, present in stored form, which is also designated the "basic code," and a second state information which is determined at random at one of the stations and is transmitted to the other station; this is also designated the "code shift information." Storage and delivery of the basic code are the function of two storage units 24 and 26. These storage units are for example punched tape readers, magnetic tape readers or photographic readers respectively in which the basic code, stored in the form of a punched tape, magnetic tape or photographic tape (film) respectively, is read. To produce the code shift information, a random generator 28 is used, which is shown present at the transmitter, and which serves, whenever required, to produce the said second state information, which is then transmitted to the receiver, as indicated symbolically by the arrows 30 and 32. Storage units 34 and 36 are used to store the said second state information at the transmitter and receiver.

Now, by mixing the first state information and the second state information, which are present at the transmitter and receiver in the storage units 24, 26, 34 and 36 respectively, in mixers 38 and 40, the initial state is formed, to which the code generators 20 and 22 are then adjusted.

As already mentioned, the second state information is preferably transmitted uncoded to the receiver. This is indicated in FIGURE 1 by the lines bearing the arrows 30 and 32.

As already mentioned, it is advantageous to use code pulse sequences possessing the form of binary numbers. In this case, mixing of a series of pulses is effected by sign multiplication or "module-2 mixing." FIGURE 2 shows such a mixing device, using logical circuitry symbols. The two series of pulses which are to be mixed together are passed to inputs 50 and 52 and feed in parallel the two inputs of an OR gate 54 and of an inverse OR gate 56. The two gates 54 and 56 in turn feed the inputs of an AND gate 58 at the output of which the result of mixing appears.

FIGURE 3 explains the mixture of pulse sequences thereby achieved. The first line 60 represents a pulse sequence which, from left to right, corresponds to the binary number 0 1 0 0 1 1 0 0 0 1 0 1 1. The line 62 shows the second binary number 1 1 0 1 1 0 1 0 0 0 1 1 0 which is to be mixed with the first number. The mixing result illustrated in line 64 therefore reads 1 0 0 1 0 1 1 0 0 1 1 0 1

To produce the purely random pulse sequences, on the one hand for the basic code and on the other hand for the code shift information, it is advantageous to use a random generator, as shown by way of example in FIGURE 4. The output of a noise generator 70 feeds a flip-flop switch 72 the output of which is in turn connected to one of the inputs of an AND-gate 74, while an impulse generator 76 is connected to the second input of the AND-gate. The output of the AND-gate feeds a second flip-flop transmitter 78, at the otuput of which there is now obtained a series of pulses whose length and time interval correspond to the frequency of the pulse transmitter 76 and whose order is virtually purely random, in view of the operation of the noise generator. The output of the second flip-flop generator 78 feeds a recorder 80 which is for example a punched tape recorder, a magnetic tape recorder or a photographic tape recorder. FIGURE 5 shows a section 90 of a usual punched tape, of the 5-element code arrangement customary in the teleprinter art. Reading devices of conventional type read the holes in the punched tape and convert them into electrical pulses, with for example "hole" corresponding to a pulse (binary number "1") and "no hole" corresponding to no pulse (binary number "0"). The mixing of the basic code information stored in the punched tapes and read by means of the readers with the code shift information is effected, for example, in the mixers shown in FIGURE 2.

Storage and mixing of the basic code and code shift information may also be effected in a purely electronic manner. Thus for example, there is shown in FIGURE 6 a shift register 100 which is used to store the basic code, the number of places in the register corresponding to the number of places in the basic code to be stored. The series of pulses to be stored is fed in pulse by pulse to an input 102, so that after feeding in of the state information is complete, the storages of the shift register 100, when read from right to left, display the state information which is present in the form of a binary number. As indicated schematically underneath, the first state information reads, for example, 0 0 1 1 . . . 0 1 1 0 1. An identically constructed shift register 104 is used to store the second state information of the code shift information, which according to the drawing reads 0 1 0 1 . . . 1 0 1 1 0. The outputs 108 and 110 of the two shift registers 100 and 104 feed a module-2 mixer which corresponds to the arrangement of FIGURE 2 and is therefore given identical reference numerals. The output of this module-2 mixer feeds a third shift register 112 which is used to store the initial state obtained by the mixing. The parallel-located outputs 114 of the shift register 112 serve to transfer the said initial state into the code generator.

The code pulse generator may consist of at least one counter-like circuit and of a feedback circuit. This has already been indicated in FIGURE 1 by partition of the blocks 20 and 22. FIGURE 7 now shows an exemplary construction of such a code pulse generator. This consists of a counter-like circuit 120 and of a feedback circuit 122. The counter-like circuit serves to ensure a minimum period of the operating cycle. In the simplest case, which is shown in this construction, a binary counter is used, the number of individual steps 124 corresponding to the number of places in the initial state. The input 126 of the lowest stage is fed by a counting pulse, so that the counter runs continuously when the arrangement is in service. When the arrangement is brought into service, the counter is set, and the individual stages are equipped with setting inputs 128 for this purpose. The said setting inputs 128 are individually connected, for example, to the outputs 114 of the mixer shown in FIGURE 6. The individual outputs of the counting stages 124 are connected to the inputs of the feedback circuit 122, which consists of five shift register loops 130, each loop having shift registers 132 located one behind another on it. In front of each of the said individual shift registers there is a module-2 mixer 134 of the type illustrated in FIGURE 2. The second inputs of these storages are connected individually to the outputs 128 of the individual stages of the counter-like circuit 120. Therefore, when this arrangement is in service, there circulates in each of the five feedback loops a pulse programme which is in turn influenced pulse by pulse via the mixer 134 dependently upon the position of the individual stages of the counter. Moreover, further feedback loops are provided within which the frequency of occurrence of modifications is dependent upon the simultaneous appearance or non-appearance of specific states at various points of the feedback circuit. For example, further module-2 mixers, 136, 146, 148, 150 and 152 are placed in the connecting leads between the counter-like circuit and the feedback circuit, and are controlled by AND-gates 138, 140, 142 and 144. The AND-gates in turn have different numbers of inputs, which are again connected to individual points of the feedback loops 130. For example, a mixing pulse is supplied only when a pulse appears at all five inputs of the AND-gate 138—i.e., when such corresponding pulses are simultaneously present at the corresponding points of the five feedback loops 130. The AND-gates 138, 140, 142 and 144 have five, four, three and two inputs respectively. Accordingly, the frequencies with which the mixers 136, 146, 148, 150 and 152 operate are different. The connecting leads of the five feedback loops 130 are furthermore passed via three interchange switch units 154, 156 and 158, each of which according to its position permutates the inputs and outputs with one another. This permutation switching system is actuated by associated impulse magnets 160, 162 and 164, which are in turn controlled by pulses within the feedback loops 130, partly with interposition of AND-gates 166 and 168. The feedback loops are again connected by five connecting leads 170 to a distributor 172 which is read in pulse rhythm by a contact 174, so that the required code pulse programme can be taken from the output 176. The feedback circuit could also be of entirely electronic construction and be equipped with any desired logical circuits. The diversity and differential frequency of operation of the feedback paths in the feedback circuit renders the operating cycle extremely complex, so that even with knowledge of an appliance and with knowledge of a portion of the pulse programme obtained at the output, it is virtually impossible to deduce the initial state of the code generator.

I claim:

1. In a method of coding messages comprising generating at a transmitting station clear message pulses and code pulses, mixing said pulses to form a coded message, transmitting said message to a receiving station, and passing said message and identical code pulses to a mixer at the receiving station to separate said clear message pulses, the steps of generating at said transmitting station by means of a code generator a code pulse sequence determined by the initial state of the code generator the number of possible initial states of which is large in comparison with $10^{10}$, determining said initial state from a first state information present in stored form at the transmitting and receiving stations and from a second state information, determining said second state information at random at one of said stations, and transmitting said second state information to the other of said stations.

2. The method of claim 1, wherein the second state information is obtained at the transmitting station by using a random generator and is passed uncoded to the other station.

3. The method of claim 1, wherein, in order to obtain the initial state of the code generator, the first and second state informations are mixed together.

4. The method of claim 1, wherein the first state information is stored in the form of a punched tape.

5. The method of claim 1, wherein the first state information is magnetically stored.

6. The method of claim 1, wherein the first state information is photographically stored.

7. In a method of coding messages comprising generating at a transmitting station clear message pulses and code pulses, mixing said pulses to form a coded message, transmitting said message to a receiving station, and passing said message and identical code pulses to a mixer at the receiving station to separate said clear message pulses, the steps of generating at said transmitting station by means of a code generator a code pulse sequence determined by the initial state of the code generator the number of possible initial states of which is large in comparision with $10^{10}$, determining said initial state in the form of a binary number from a first state information present in stored form at the transmitting and receiving stations and from a second state information, the first and second state informations having the form of binary numbers, determining said second state information at random at one of said stations, and transmitting said second state information to the other of said stations.

8. The method of claim 7, wherein the first state information is obtained by using a random generator.

9. The method of claim 7, wherein the second state information is obtained at the transmitting station by using a random generator and is passed uncoded to the other stations.

10. In a method of coding messages comprising generating at a transmitting station clear message pulses and code pulses, mixing said pulses to form a coded message, transmitting said message to a receiving station, and passing said message and identical code pulses to a mixer at the receiving station to separate said clear message pulses, the steps of generating at said transmitting station, by means of a code generator having at least one counter-like circuit and at least one feedback circuit cooperable to form the code pulse sequence, a code pulse sequence determined by the initial state of the code generator the number of possible initial states of which is large in comparison with $10^{10}$, determining said initial state from a first state information present in stored form at the transmitting and receiving stations and from a second state information, determining said second state information at random at one of said stations, and transmitting said second state information to the other of said stations.

11. The method of claim 10, wherein the initial state of the counter-like circuit is determined by the first and second state informations.

12. The method of claim 10, wherein the initial position of the feedback circuit is determined by the first and second state informations.

13. The method of claim 10, wherein the initial positions of the counter-like circuit and the feedback circuit are determined by the first and second state informations.

14. For use in the transmission of coded messages from a transmitting station to a receiving station, an arrangement comprising a code generator at each station, which generator is adapted to transmit a code pulse sequence determined by the initial state of the code generator and the number of initial states of which is large in comparison with $10^{10}$, a source of stored information at each station for generating a first state information, means for determining at random at one of said stations a second state information, means for transmitting said second state information to the other of said stations, and means for determining the initial state of each of said code generators from said first and second state informations.

No references cited.

NEIL C. READ, *Primary Examiner.*

T. A. ROBINSON, *Examiner.*